United States Patent Office 3,436,441
Patented Apr. 1, 1969

3,436,441
META-CHLORINATED OR BROMINATED PHENYL PHOSPHATES
Quentin E. Thompson, Belleville, Ill., assignor to Monsanto Company, St. Louis, Mo., a corporation of Delaware
No Drawing. Filed Dec. 24, 1964, Ser. No. 421,112
Int. Cl. C09f 9/12; C10m 3/40
U.S. Cl. 260—966        5 Claims This invention relates to certain novel halogenated phenyl phosphates and to their use as functional fluids.

In particular the new compounds of this invention are bromine- or chlorine-substituted triphenyl phosphates in which such halogens are always in the meta position. These new compounds can be represented by the structure

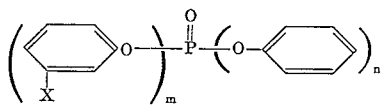

where X is bromo or chloro, $m$ is 1 or 2, $n$ is 1 or 2 and the sum of $m+n$ is 3.

The compounds of this invention are useful as fire resistant functional fluids, which term includes many different types of applications, such as electronic coolants, atomic reactor coolants, diffusion pump fluids, synthetic lubricants, damping fluids, bases for greases, force transmission fluids (hydraulic fluids) and as filter mediums for air conditioning systems.

The compounds of this invention can be prepared by reacting a m-halophenol with a phenyl phosphorochloridate in pyridine or other suitable solvent such as triethylamine or dimethylaniline and isolating the desired product by conventional washing and distillation. If phenyl phosphorodichloridate is used the compound prepared will be a phenyl di(m-halophenyl)phosphate whereas if diphenyl phosphorochloridate is used the compound prepared will be diphenyl m-halophenylphosphate. The preparation of a specific compound of this invention is illustrated in the following example in which parts are parts by weight.

Example 1

Into a suitable reaction vessel there was charged 250 ml. of pyridine and 129 parts of m-chlorophenol. After thoroughly mixing the resulting mixture, 269 parts of diphenyl phosphorochloridate was added over a period of about two hours while keeping the temperature of the reaction mass below 100° C. After completing the addition of the chloridate the reaction mass was agitated for an additional two hours during which time the temperature of the mass was kept at about 80° C. Thereafter 500 parts of water and 200 ml. of methylene chloride were added and mixed with the reaction mass. An organic and a water layer were then allowed to separate and the water layer was discarded.

The organic layer was washed free of pyridine using successive washes of a 5% hydrochloric acid solution. Thereafter the organic material was washed with dilute caustic and then water after which the methylene chloride was stripped with the aid of reduced pressure. The residue was then fractionally distilled to provide 300 parts of m-chlorophenyl diphenyl phosphate, a colorless liquid, which had a boiling point of 216° C. at 0.65 mm. of mercury and an index of refraction, $n_D^{25}$, of 1.5687.

The physical properties of the other compounds of this invention prepared as described above are given in Table I below.

TABLE I

| Compound | B.P., °C./mm. of Hg | Index of refraction, $n_D^{25}$ |
|---|---|---|
| m-Bromophenyl diphenyl phosphate | 313–215/0.60 | 1.5810 |
| Di(m-chlorophenyl) phenyl phosphate | 232–233/0.70 | 1.5739 |
| Di(m-bromophenyl) phenyl phosphate | 228–229/0.60 | 1.5946 |

In addition to the above-described compounds, it is also contemplated for purposes of this invention to use as functional fluids mixtures of one or more compounds of this invention with each other and/or with either triphenyl phosphate and/or one or more tri(m-halophenyl) phosphates in which there is at least about 50% and preferably about 65 to 70% by weight of one or more compounds of this invention. Such mixtures can be prepared by blending the various components or preferably is the mixture of compounds prepared by reacting a mixture of phenol and m-halophenol with phosphorus oxychloride under conditions where random distribution of the aryloxy groups results. The composition of such mixture corresponds, on the average, to the mixture which would be obtained by thermodynamic reorganization of a compound of this invention (which mixture of course can also be used). Thus, if phenol and m-halophenol are employed in a mol ratio of 2:1, respectively, the composition resulting therefrom corresponds to the composition that would be obtained by the reorganization of a m-halophenyl diphenyl phosphate, whereas if a mol ratio of phenol to m-halophenol of 1:2, respectively, is employed the average composition of the resulting mixture corresponds to the composition that would be obtained by the reorganization of a di(halophenyl) phenyl phosphate. The latter-described mixtures are desirable materials for use as functional fluids because they are less costly to manufacture and generally have about the same viscosity and decomposition point of the specific compound from which they could be manufactured. In the case of pour points, however, the mixture corresponding to the mixture generally obtained by reorganization of a m-halophenyl diphenyl phosphate will have a higher pour point than said phosphate whereas the mixture corresponding to the mixture generally obtained by reorganization of a di(m-halophenyl) phenyl phosphate will have a lower pour point than the latter phosphate. Crystallizing points will be higher with both types of mixtures. A further advantage of all of the above-described mixtures is that they can contain both bromine and chlorine.

The preparation of mixtures corresponding to the compositions that would be obtained by the thermal reorganization of a m-halophenyl diphenyl phosphate and a di(halophenyl) phenyl phosphate are illustrated in the following examples.

Example 2

In a suitable reaction vessel, two mols of phenol and one mol of m-chlorophenol were mixed with 1.5 g. of anhydrous magnesium chloride and warmed to 90° C. One mol of phosphorus oxychloride was then added dropwise over one hour. The temperature was raised slowly to 150° C. and held there for two hours as the last of the byproduct hydrogen chloride was driven from the reaction mixture. The reaction vessel was then evacuated and the triaryl phosphate mixture distilled at reduced pressure. The mixture had a boiling range of 210–235° C. at about 0.5 mm. of mercury and an index of refraction, $n_D^{25}$, of 1.5685. The mixture has an average composition containing about 25% triphenyl phosphate, 46% m-chlorophenyl diphenyl phosphate, 26% di(m-chlorophenyl) phenyl phosphate and 3% tri(m-chlorophenyl) phosphate.

Upon replacing m-chlorophenol with m-bromophenol, there is obtained a mixture generally corresponding to what would be obtained from the reorganization of m-bromophenyl diphenyl phosphate but having a percentage composition analogous to that noted above. The mixture had a boiling range of 210–240° C. at about 0.5 mm. of mercury and an index of refraction, $n_D^{25}$, of 1.5812.

Example 3

Following the general procedure of Example 2, one mol of phenol, two mols of m-bromophenol and 1.5 g. anhydrous magnesium chloride were caused to react with phosphorus oxychloride. The crude product was then subjected to vacuum distillation to yield a mixture, containing about 3% triphenyl phosphate, 24% m-bromophenyl diphenyl phosphate, 45% di(m-bromophenyl) phenyl phosphate, and 29% tri(m-bromophenyl) phosphate, which had a boiling range of 225–240° C. at about 0.6 mm. of mercury and an index of refraction, $n_D^{25}$, of 1.5947.

Upon replacing m-bromophenol with m-chlorophenol, there was obtained a mixture, containing about 3% triphenyl phosphate, 24% m-chlorophenyl diphenyl phosphate, 45% di(m-chlorophenyl) phenyl phosphate, and 29% tri(m-chlorophenyl) phosphate, which had a boiling range of 223–236° C. at about 0.6 mm. of mercury and an index of refraction, $n_D^{25}$, of 1.5740.

It is to be noted that the compounds of this invention are extremely valuable for the uses previously disclosed as compared to other isomeric halophenyl phenyl phosphates. For example, those phosphates where the halogen is in the ortho position have greatly higher low temperature viscosities and are not as thermally stable as the instantly claimed compounds, whereas those phosphates where the halogen is in the para position crystallize at significantly higher temperatures than the meta isomers.

In addition to the above the compounds of this invention are shear stable and are not prone to foaming and any foam formed is not stable. Furthermore, the claimed compositions have good stability, even at temperatures of 550° F. and in the presence of oxygen, and even up to such temperatures are essentially non-corrosive to metals, such as aluminum bronze, iron, silver and titanium. A further advantage of the instant compositions is their outstanding hydrolytic stability as compared to tri(m-halophenyl) phosphates.

As a result of the excellent physical properties of the functional fluids described herein, improved hydraulic pressure devices can be prepared in accordance with this invention which comprise in combination a fluid chamber and an actuating fluid in said chamber, said fluid comprising one or more of the compounds or compositions hereinbefore described. In such a hydraulic apparatus wherein a movable member is actuated by the above-described functional fluids, performance characteristics are obtainable which are superior to those heretofore obtainable.

Because of the excellent fire-resistance of the functional fluids of this invention as well as other properties, the functional fluids of this invention are especially useful in those hydraulic systems wherein power must be transmitted and the frictional parts of the system lubricated by the hydraulic fluid utilized. Thus, the novel functional fluids of this invention and mixtures thereof find utility in the transmission of power in a hydraulic system having a pump therein supplying the power for the system. In such a system, the parts which are so lubricated include the frictional surfaces of the source of power, namely the pump, valves, operating pistons and cylinders, fluid motors, and in some cases, for machine tools, the ways, tables and slides. The hydraulic system may be of either the constant-volume or the variable-volume type of system.

The pumps may be of various types, including the piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers axial-piston pump, or in which the mechanism which drives the pistons is set at an angle adjustable with the cylinder block; gear-type pump, which may be spur, helical or herringbone gear, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

The compositions of this invention can also contain dyes, pour point depressants, antioxidants, antifoamants, defoamants, such as the silicone polymers, viscosity index improvers, such as polyalkylacrylates and polyalkylmethacrylates, lubricity agents and the like.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. A compound represented by the structure

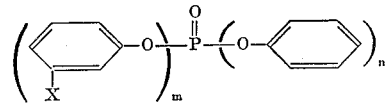

where X is selected from the group consisting of bromo and chloro, $m$ is a whole number from 1 to 2, $n$ is a whole number from 1 to 2 and the sum of $m+n$ is 3 and mixtures thereof.

2. m-Chlorophenyl diphenyl phosphate.
3. m-Bromophenyl diphenyl phosphate.
4. Di(m-chlorophenyl) phenyl phosphate.
5. Di(m-bromophenyl) phenyl phosphate.

References Cited

UNITED STATES PATENTS 2,340,331   2/1944   Knutson et al. _____ 260—966 XR

JOSEPH P. BRUST, Primary Examiner.

A. H. SUTTO, Assistant Examiner.

U.S. Cl. X.R.

252—78, 32.5; 260—973